United States Patent
Quiroga

(10) Patent No.: US 7,039,899 B1
(45) Date of Patent: May 2, 2006

(54) SYSTEM AND METHOD FOR AUTOMATICALLY GENERATING A SCRIPT FOR TESTING SOFTWARE

(75) Inventor: Salvador Maiorano Quiroga, Dublin, CA (US)

(73) Assignee: Oracle International Corporation, Redwood Shores, CA (US)

(*) Notice: Subject to any disclaimer, the term of this patent is extended or adjusted under 35 U.S.C. 154(b) by 580 days.

(21) Appl. No.: 10/112,541

(22) Filed: Mar. 27, 2002

(51) Int. Cl.
*G06F 9/44* (2006.01)

(52) U.S. Cl. .................. 717/115; 717/124; 717/125

(58) Field of Classification Search ........ 717/168–178, 717/115, 124, 125; 714/4–125
See application file for complete search history.

(56) References Cited

U.S. PATENT DOCUMENTS

| | | | |
|---|---|---|---|
| 5,694,540 A * | 12/1997 | Humelsine et al. ........... | 714/38 |
| 5,754,755 A * | 5/1998 | Smith, Jr. .................... | 714/38 |
| 6,134,674 A * | 10/2000 | Akasheh ...................... | 714/33 |
| 6,148,427 A * | 11/2000 | Sherwood et al. .......... | 714/738 |
| 6,249,882 B1 * | 6/2001 | Testardi ....................... | 714/38 |
| 6,360,332 B1 * | 3/2002 | Weinberg et al. .............. | 714/4 |
| 6,405,365 B1 * | 6/2002 | Lee ............................. | 717/106 |
| 6,442,714 B1 * | 8/2002 | Griffin et al. ................. | 714/46 |
| 6,463,552 B1 * | 10/2002 | Jibbe ........................... | 714/33 |
| 6,530,039 B1 * | 3/2003 | Yang ........................... | 714/38 |
| 6,775,824 B1 * | 8/2004 | Osborne et al. ............. | 717/125 |
| 2003/0070119 A1 * | 4/2003 | Dallin ......................... | 714/38 |
| 2004/0205406 A1 * | 10/2004 | Kaliappan et al. ........ | 122/58 R |

OTHER PUBLICATIONS

Balcer et al., "Automatic Generation of Test Scripts from Formal Test Specifications", ACM 089791 Nov. 1989, pp. 210-218.*

* cited by examiner

*Primary Examiner*—Wei Y. Zhen
*Assistant Examiner*—Mulubrhan Tecklu

(57) ABSTRACT

A script generator facilitates the testing of software, such as application software or other software. The script generator automatically generates a script from metadata that includes code defining the application software. The script contains logic for the application software. The script is used in conjunction with a second set of data, such as a spreadsheet, that is extracted from application data and metadata by the script generator or is created manually. An execution engine uses the script and corresponding second set of data to simulate an end user's potential use of the application software. The application software is thus efficiently tested in this manner.

31 Claims, 9 Drawing Sheets

SYSTEM AND METHOD FOR AUTOMATICALLY GENERATING A SCRIPT FOR TESTING SOFTWARE

CROSS-REFERENCES TO RELATED APPLICATIONS

Not applicable.

BACKGROUND OF THE INVENTION

1. Field of the Invention

The present invention relates generally to the field of computer software, and more particularly to a system and method for automatically generating a script for testing software (e.g., application software, etc.).

2. Background of the Invention

It is often desirable for a test user to be able to test application software (or other types of software) for a variety of reasons. A test user is one who tests the software. For example, a test user may want to test the software just before it is commercially released in order to remedy any remaining bugs. This will ensure that an end user will be using software with as few bugs as possible. An end user is one who uses the software, but is not necessarily involved in testing the software.

A test user may also want to test the software during various stages of development. Testing during development can assist in finding bugs as well. Testing during development can also assist in streamlining and improving various aspects of the software, including the operation, user-friendliness, etc. As testing occurs throughout a design cycle, the software can be modified accordingly. Implementing an iterative process of repeatedly testing and refining the software is typically much more efficient than completing the design before doing any testing.

Referring to FIG. 1, one prior art system 100 is shown for testing application software 102. Application software 102 is defined by code stored as part of data 104. A manned computer system 106 is used to test application software 102. A test user sits at manned computer system 106 and attempts to exhaustively test application software 102 manually using a graphical user interface (GUI) or otherwise. This is a very inefficient brute force method of testing application software 102. For complex application software 102, there may be thousands of pages (or screens) that may possibly be displayed to a test user. It may take the test user hundreds of hours to test the application software. Even then, one cannot be certain that application software 102 has been tested adequately. And if further testing is desired the entire process might have to be repeated in whole or in part.

Referring to FIG. 2, another prior art system 200 is shown for testing application software 102. Application software 102 is again defined by code stored as part of data 104. Manned computer system 106 is used to test application software 102. A test user sits at manned computer system 106 and attempts to exhaustively test application software 102 manually using a GUI or otherwise. A record engine 208 is configured to record the test user's navigation through application software 102 as the test user is manually testing application software 102. This testing will often involve entering data into application software 102 as well. The data is stored as part of data 104.

Record engine 208, in turn, creates record script 210. This process is purely a recordation of the test user's activity with respect to application software 102. Record script 210 is used in conjunction with execution engine (or playback engine) 212. Record script 210 simply instructs execution engine 212 to simulate the test user's testing with respect to application software 102. Thus, execution engine 212 simulates the many arduous hours the test user spent manually attempting to thoroughly test application software 102. Nevertheless, this is still a very inefficient method of testing application software 102. As previously mentioned, there may be thousands of pages that may possibly be displayed for complex application software 102. It may take the test user hundreds of hours to manually test application software 102. Even then, the test user cannot be certain that application software 102 has been tested adequately. Again, if further testing is desired the entire process might have to be repeated in whole or in part. For example, one may want to quickly verify changes, new enhancements and fixes to be released. The prior art attempts do not allow for rapid testing under these circumstances.

Another prior art attempt at testing application software also includes using a script to automate the testing process. These scripts are run and they simulate a test user's manual testing of application software 102. However, these scripts are hardcoded (i.e., manually created) as opposed to playing back a recorded session. Yet another prior art attempt includes hardcoding scripts to randomly perform commands on application software 102 to ensure that application software 102 will not crash. The creation of these scripts is very expensive and time-consuming requiring much programmer time and/or much test user testing time. Moreover, if application software 102 is modified, the hardcoded scripts often must be modified by hand as well.

SUMMARY OF THE INVENTION

The present invention provides in various embodiments a system and method for automatically generating a script for testing software (e.g., application software, etc.).

In a system according to one embodiment of the present invention, the system facilitates automatically generating a script for testing software. The system comprises a first set of data defining software, a script generator coupled to the first set of data and configured to automatically generate a script for testing the software, and an execution engine coupled to receive the script and configured to test the software.

In a method according to another embodiment of the present invention, the method facilitates automatically generating a script for testing software. The method comprises retrieving information from a first set of data defining software, analyzing the retrieved information, and generating a script from the analyzed retrieved information for testing the software.

A further understanding of the nature and advantages of the inventions herein may be realized by reference to the remaining portions of the specification and the attached drawings.

DESCRIPTION OF THE SPECIFIC EMBODIMENTS

Figure 1:
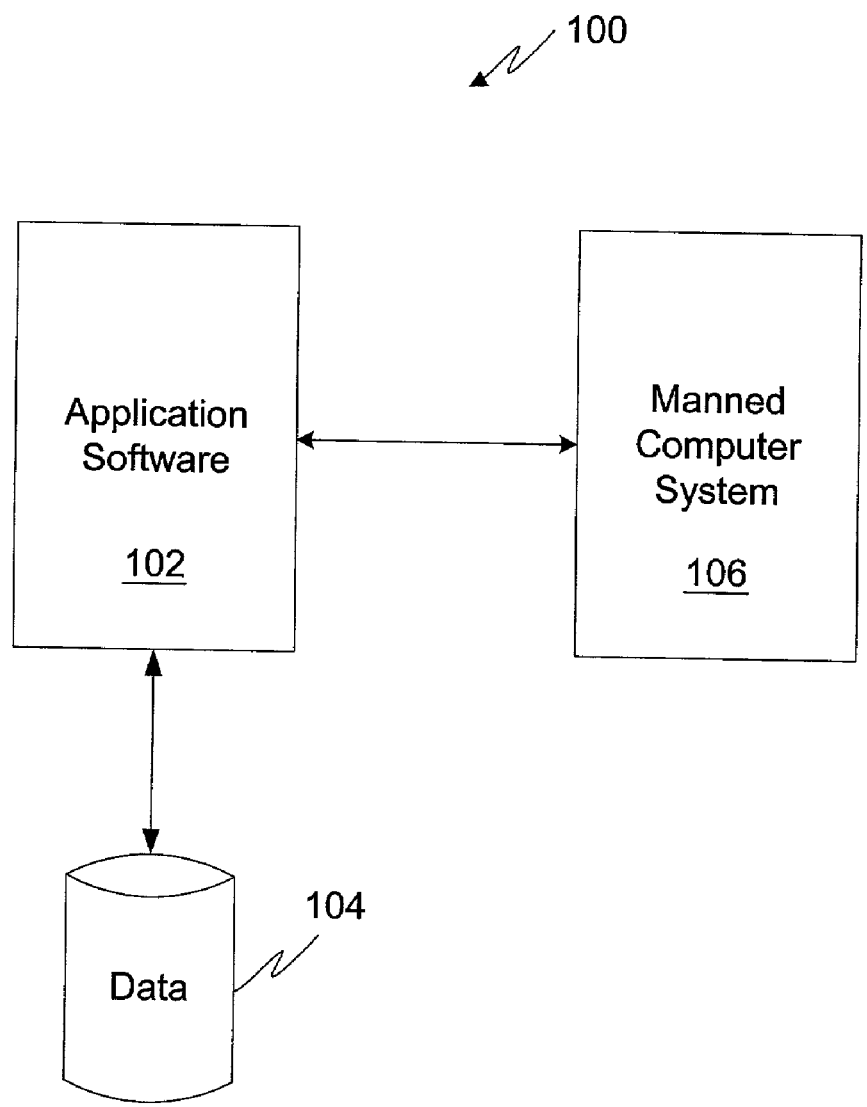
FIG. 1 is a schematic diagram of a prior art attempt at testing application software.
Figure 2:
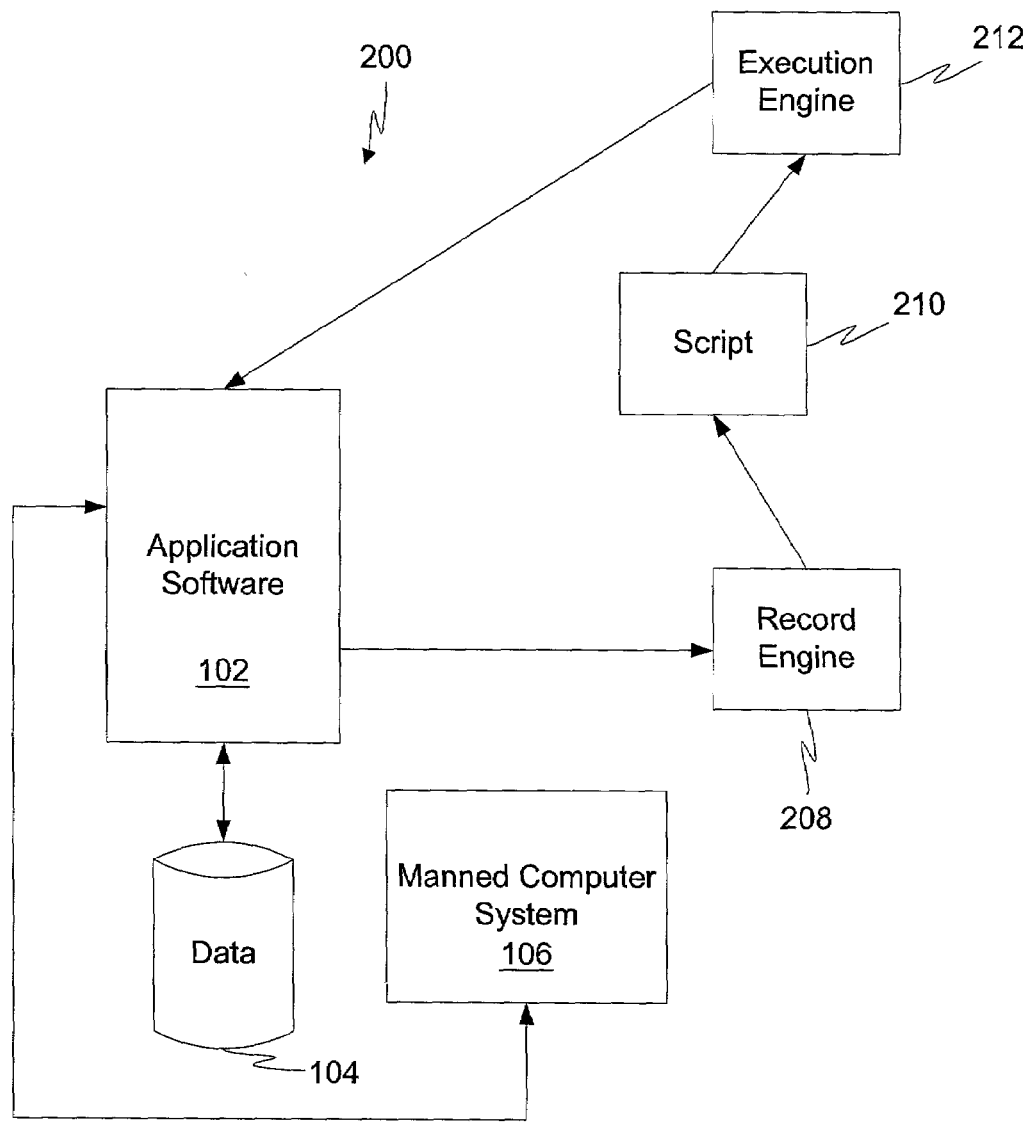
FIG. 2 is a schematic diagram of another prior art attempt at testing application software.

As shown in the exemplary drawings wherein like reference numerals indicate like or corresponding elements among the figures, various embodiments of a system according to the present invention will now be described in detail. The following description sets forth an example of a system and method for automatically generating a script for testing software.

Detailed descriptions of various embodiments are provided herein. It is to be understood, however, that the present invention may be embodied in various forms. Therefore, specific details disclosed herein are not to be interpreted as limiting, but rather as a basis for the claims and as a representative basis for teaching one skilled in the art to employ the present invention in virtually any appropriately detailed system, structure, method, process or manner.

As mentioned previously, it is often desired to thoroughly and quickly test application software (or other types of software) for various reasons. For example, a test user may want to test the software just before it is released in order to remedy any lingering bugs.

Furthermore, a test user may also want to test the software during various stages of development. Testing during development can assist in finding bugs. Testing during development can also assist in streamlining and improving various aspects of the software, including the operation, user-friendliness, etc. As testing occurs throughout a design cycle, the software can be modified accordingly. Implementing an iterative process of repeatedly testing and refining the software is much more efficient than completing the design before doing any testing.

Figure 3:
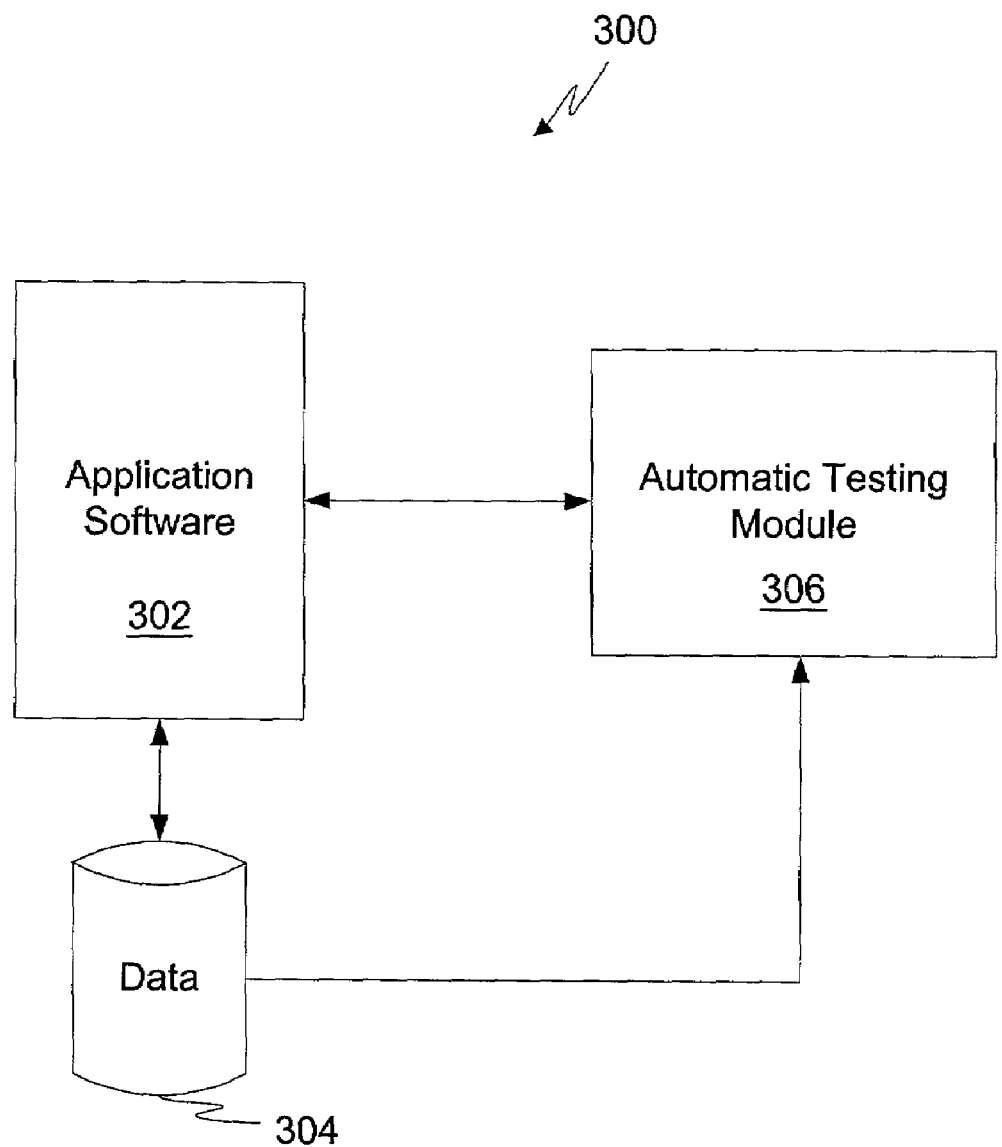
FIG. 3 is a schematic diagram of a system according to one embodiment of the present invention.

Referring to FIG. 3, system 300 according to some embodiments of the present invention is depicted. System 300 facilitates automatically generating a script for testing application software 302 (or other types of software). Therefore, in one embodiment, system 300 comprises application software 302, a first set of data, such as data 304, and automatic testing module 306. Application software 302 is defined by code in the form of data 304. Data 304 defines some or all of application software 302. Automatic testing module 306 is coupled to application software 302 in a bidirectional fashion. Automatic testing module 306 is also coupled to data 304. It should be noted that application software 302 is stored in data 304, but can execute elsewhere as indicated by the bidirectional arrow between application software 302 and data 304.

Figure 4:
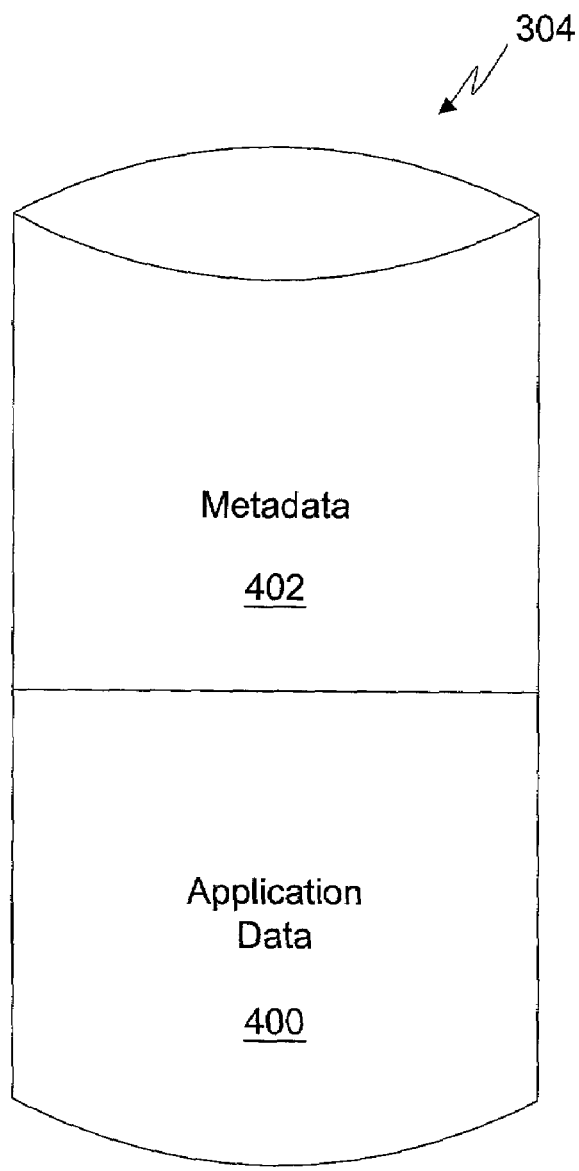
FIG. 4 illustrates an exemplary database including application data and metadata.

Referring to FIG. 4, data 304 comprises application data 400 and metadata (system data) 402 in one embodiment. Application data 400 includes code that defines application software 302. Application data 400 also comprises other data. For example, application data 400 can comprise financial data, customer records, business transactions data, etc. Application data 400 can, in one embodiment, be entered into a database via application software 302.

Metadata 402 is information about other data. For example, metadata 402 tells users or software how a portion of application data 400 is to be displayed, in addition to the format and intended use(s) of the application data. This information can guide a user (or software) through a database(s) and help in understanding the meaning and context of financial data, customer records, business transactions, etc., stored therein, as is well known in the art of the present invention. Metadata 402 is a pool of information about application data 400, which can range from technical details such as the size of a database entry to a list of the business uses intended for different pieces of data. The descriptions guide the user (or a computer program) to the right business data and then help in understanding what application data 400 means and how application data 400 is to be displayed. Metadata 402 also helps define the look, feel and logic of application software 302 (i.e., how application software 302 appears on a screen and how one interacts with application software 302). Application control logic, embedded within metadata 402, is logic related to how to manage or use application software 302. Application control logic refers to things such as how application software 302 presents information to a user, how a user enters data (the order required for entering data, etc.), how a user navigates through pages, how information is displayed, etc.

Figure 5:
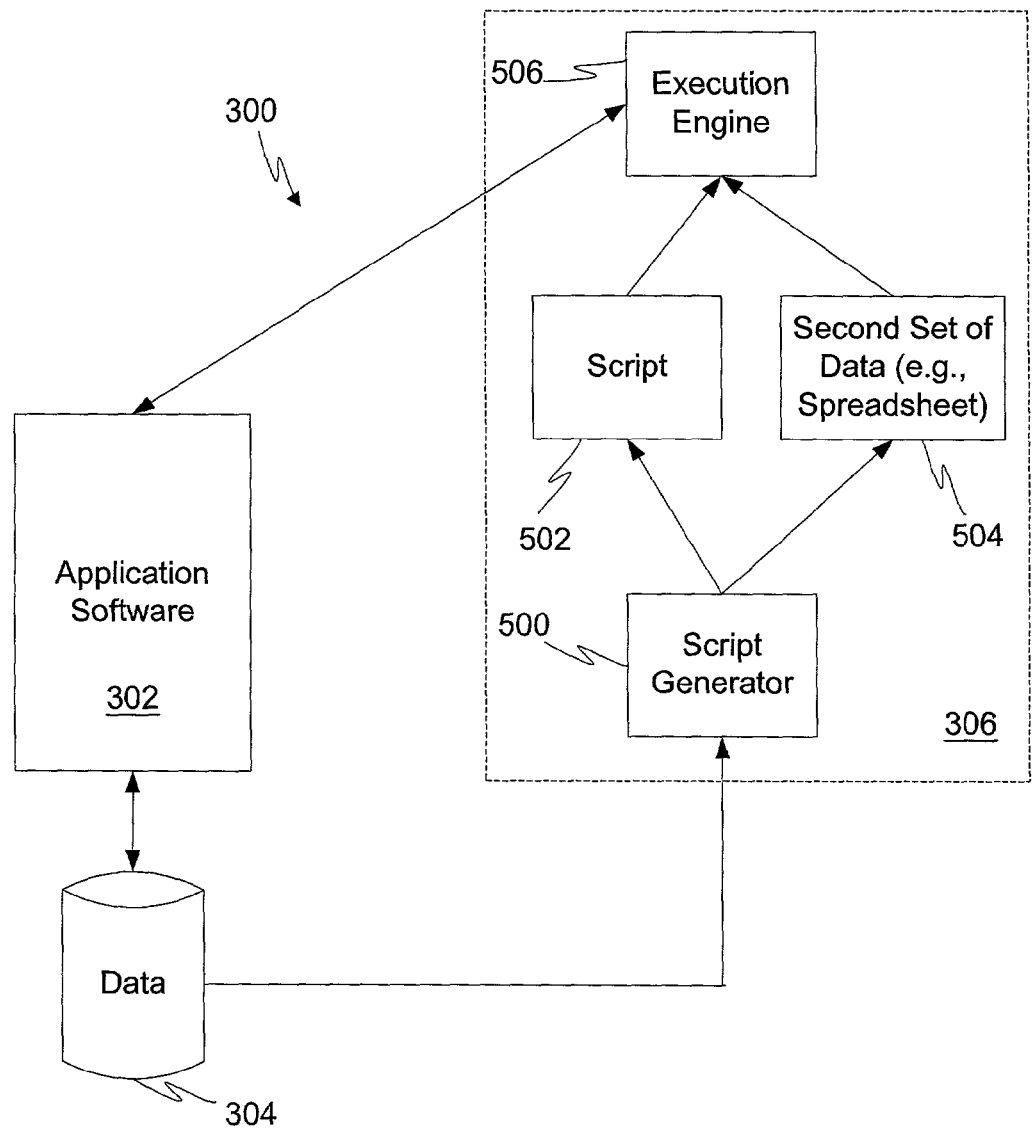
FIG. 5 illustrates FIG. 3 in greater detail.

In keeping with some embodiments according to the present invention, referring to FIG. 5, system 300 of FIG. 3 is depicted in further detail. As can be seen, automatic testing module 306 comprises script generator 500, script 502, second set of data (or spreadsheet) 504, and execution engine (or playback engine) 506. Script generator 500 is coupled to data 304, and execution engine 506 is coupled to application software 302.

In further keeping with some embodiments according to the present invention, script generator 500 is configured to generate script 502 and spreadsheet 504. Script generator 500 automatically generates script 502 from logic within metadata 402 of data 304. Likewise, script generator 500 generates spreadsheet 504 (the second set of data) from metadata 402 and application data 400 of data 304. Alternatively, spreadsheet 504 can be manually created or populated. It is contemplated that the second set of data can be in a form other than that of spreadsheet 504.

Script 502 and spreadsheet 504 can be used to facilitate testing application software 302. Execution engine (playback engine) 506 is coupled in a bidirectional fashion to application software 302, as explained herein. Script 502 instructs execution engine 506 to operate on application software 302. Execution engine 506 can access data from spreadsheet 504. Execution engine 506 thoroughly tests application software 302 for proper functionality. It is noteworthy that the test user can modify script 502 such that only certain aspects of application software 302 are tested. Similarly, the test user can limit the scope of what script 502 gets generated originally such that only certain aspects of application software 302 are tested. As execution engine 506 operates on application software 302, execution engine 506 receives results from application software 302. Execution engine 506 stores the results in any appropriate place, such as a database. The results are also displayed to the test user if desired.

Figure 6:
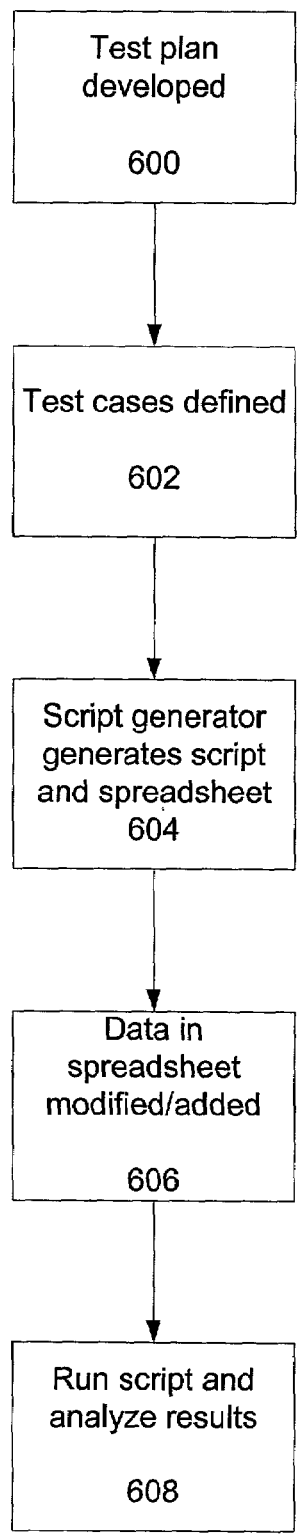
FIG. 6 is a flowchart of one exemplary overall testing process.

Referring to FIG. 6, one exemplary overall testing process is illustrated. At step 600, a test plan for testing application software 302 is developed. For example, application software 302 to be tested may be an extremely large application. A test user may desire not to test application software 302 exhaustively, but rather to test only certain aspects of the functionality of application software 302. Application software 302 may actually be a large product line comprising many smaller product applications (e.g., financial product applications). As another example, application software 302, or portions thereof, may have had a fix(s) added to it to remedy a bug(s). The test user may want to solely test the aspect(s) of application software 302 that will enable him or her to determine if a fix worked properly. Timing of the testing of various aspects of application software 302 is also considered at this step.

At step 602, test cases are defined. For example, the test user defines the specific business scenarios that will exist while testing application software 302. One exemplary test case can involve a customer that has locations in France and the United Kingdom, and this will have tax implications that the test user wants taken into account as part of the testing process. Based upon this and other information, the test user defines input test data and expected output test data, discussed herein. Input test data is data that a potential end user of application software 302 could enter into application software 302 during use of application software 302. Expected output test data is the data that one would expect application software 302 to output to the end user, in response to the input test data, if working properly. For example, a given financial transaction is defined by input test data. The expected output test data is that $1053 in taxes must be paid for the financial transaction of interest.

The test user populates application data 400 with the input test data, if desired, via application software 302 or otherwise. Alternatively, application data 400 may have been pre-populated with the input test data. This input test data will later be extracted from application data 400 and inputted into spreadsheet 504. Expected output data can be added into spreadsheet 504 at that time as well, as described herein.

In one embodiment, as the test user populates application data 400 with the input test data, application software 302 may at times calculate, display to the test user and/or store output data in application data 400. This output data, which is later extracted from application data 400 and inputted into spreadsheet 504, becomes additional expected output test data for testing purposes. During later use, given the same input by an end user, application software 302 should produce data corresponding to this expected output test data.

At step 604, script generator 500 generates script 502 and spreadsheet 504. At this time, script generator 500 optionally extracts the input test data as well as any additional expected output test data from application data 400 and inputs the data into spreadsheet 504, as described herein.

At step 606, an optional step, the test user can choose to modify data in spreadsheet 504 and/or add new data to spreadsheet 504. These modifications and/or additions provide additional parameters that enable script 502 to perform additional testing of application software 302 functionality. Further, these modifications and/or additions provide additional parameters that enable script 502 to test application software 302 functionality that might otherwise not be tested. The test user can also add expected output test data from step 602 into spreadsheet 504 at this time.

At step 608, script 502 is run. Running script 502 causes execution engine 506 to automatically test application software 302. Execution engine 506 uses test data from spreadsheet 504, in one embodiment. While execution engine 506 is operating on application software 302, execution engine 506 is also receiving output from application software 302. The bidirectional arrow between execution engine 506 and application software 302, shown in the embodiment of FIG. 5, evidences this feedback. This output data from application software 302 is written to a file so that the test user (or software) can analyze the output data to determine if the output data matches the expected output test data. The output data can be coded depending upon whether it is correct, an error or a possible error.

Figure 7:
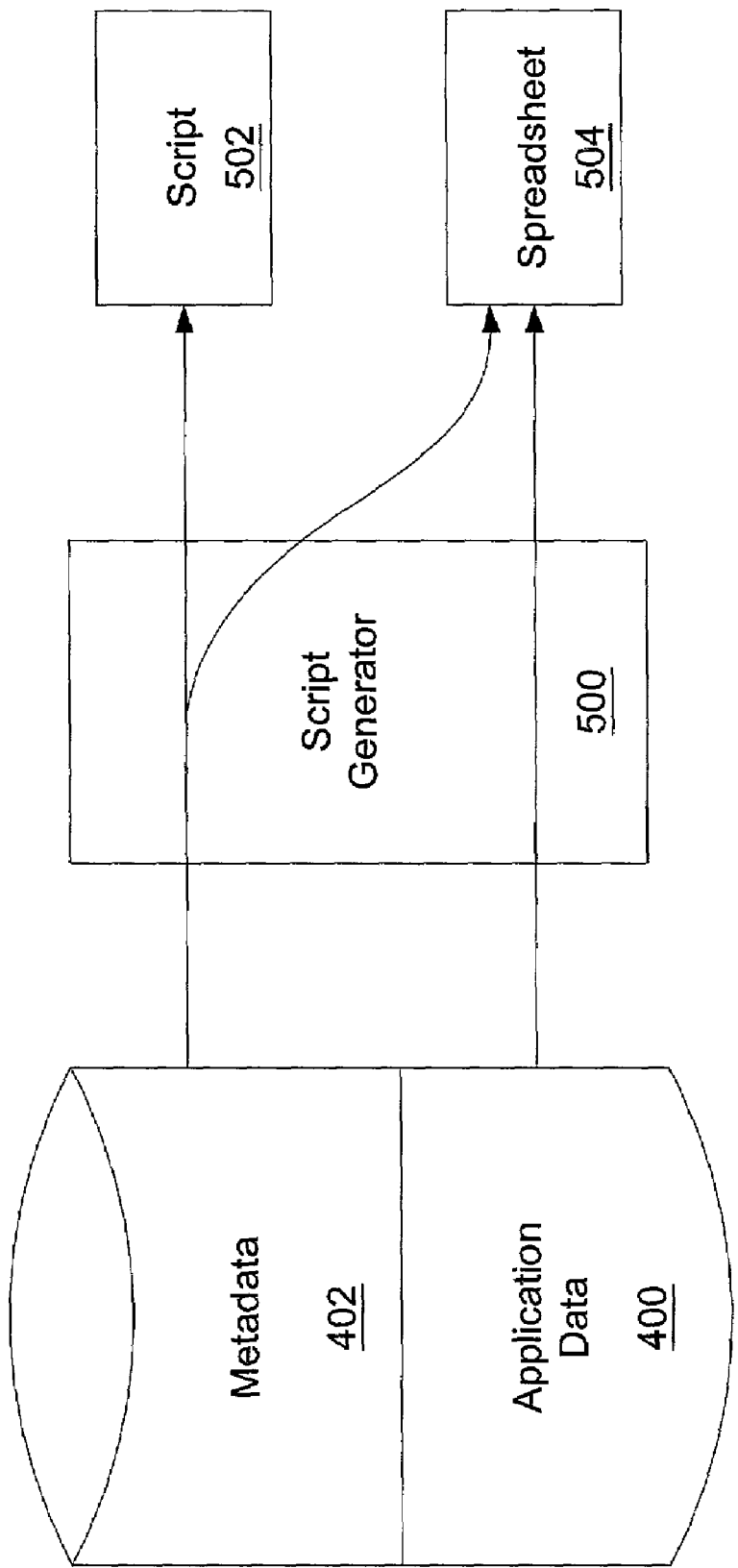
FIG. 7 is a schematic diagram that illustrates a step of the flowchart of FIG. 6 in greater detail.

Referring to FIG. 7, step 604 is shown in greater detail in a schematic fashion. As was explained with reference to FIG. 4, data 304 comprises application data 400 and metadata 402 in one embodiment. Script generator 500 reads from both metadata 402 and application data 400, as shown.

Script generator 500 analyzes metadata 402 and application data 400, as described herein. In one embodiment, script generator 500 then writes script 502 to a text file and spreadsheet 504 to an appropriate file. Each script is capable of testing one or more components, or sets of pages, of application software 302.

In one embodiment, metadata 402 is the data that script generator 500 uses to generate script 502. Script 502 contains logic related to application software 302, that is, the sequence of actions used to manage, use or interface with, application software 302.

Spreadsheet 504 comprises application data 400 that is to be used by script 502. In one embodiment, spreadsheet 504 comprises application data 400 and metadata 402. Script generator 500 can generate spreadsheet 504 containing no test data if no application data 400 already exists or if the test user so desires. In these cases, the test user can enter test data into spreadsheet 504 during step 606 of FIG. 6.

Figure 8:
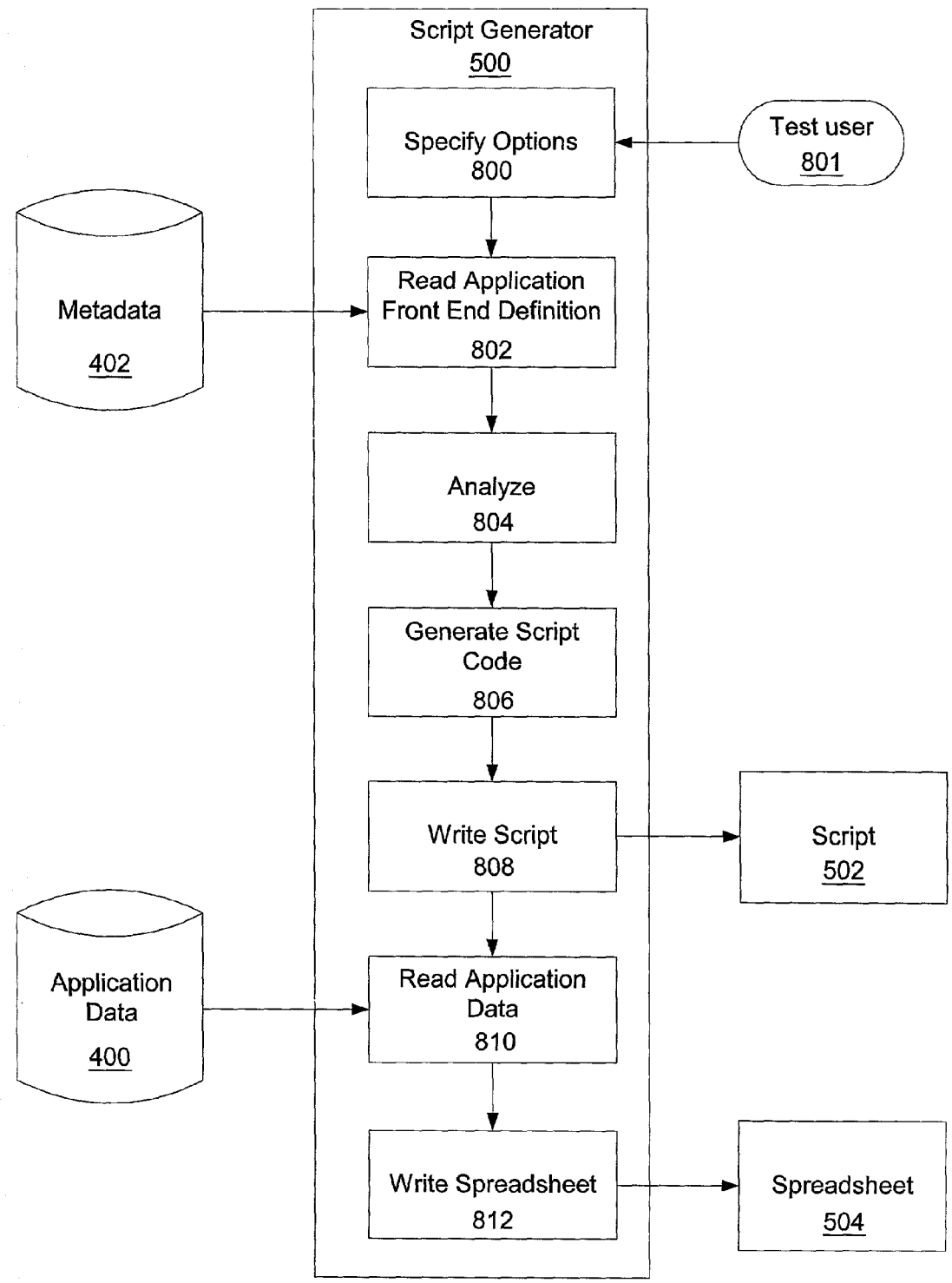
FIG. 8 shows one embodiment of an exemplary script generator in greater detail.

FIG. 8 illustrates details of one exemplary embodiment of what happens within script generator 500 during step 604 of FIG. 6. At step 800, test user 801 specifies options by use of a GUI or otherwise. Test user 801 specifies the output path of script generator 500 (i.e., to what directory to write script 502). Test user 801 also specifies which application task(s) he or she is interested in testing (i.e., which components of application software 302 to test). In contrast, prior art techniques required a test user to actually perform the testing, navigating through pages and inputting data, which could be a laborious endeavor.

The present system automatically generates script 502 without requiring the type of test user interaction required in the prior art. Furthermore, the present system allows for the virtually simultaneous generation of multiple scripts 502 for testing multiple application tasks. The prior art techniques required a new period of test user interaction in order to generate each script, one after the other.

At step 800, test user 801 also instructs script generator 500 to proceed with generation of script 502 and spreadsheet 504. At step 802, script generator 500 reads an application front-end definition from metadata 402. The application "front-end" refers to the part of application software 302 that is responsible for interfacing with a user (i.e., a GUI). The application front-end definition includes how the application task(s) is defined and how the application server is going to present data to a user, such as an end user. The application front-end definition includes the access path to the desired page or pages, the information to be entered or displayed, the relationship between data, labels used to present information, and control objects (i.e., objects that perform certain system operations such as find, delete, save, exit, etc.).

Still referring to step 802, script generator 500 retrieves information from data 304 defining application software 302, or defining a portion thereof. In one embodiment, the information that script generator 500 retrieves is related to a component to be tested. This information comprises what types of actions a user, which can include an end user or a test user, can perform for given fields within the component. In one embodiment, these types of actions relate in general to a user's ability to modify information in the component.

For example, the information retrieved corresponding to a given component can include the fact that a user can add information to application data 400. As another example, the information retrieved corresponding to a given component can include the fact that a user can update preexisting information in application data 400. As a still further example, the information retrieved corresponding to a given field can include the fact that a user can perform more than one action related to the component and what actions those are. The information retrieved also comprises, in some instances, what parts of the component merely display information to a user and do not involve user interaction.

Script generator 500 then retrieves a page identifier for the pages within the component to be tested. Script generator 500 also retrieves a label (e.g., a word) corresponding to the page identifiers. It is contemplated that, in one embodiment, script generator 500 is configured to generate script 502 for testing more than one component.

Next, script generator 500 retrieves the field identifiers within the pages. For the field identifiers, script generator 500 retrieves, for example: a field label; a data type for the field (e.g., character, integer, decimal, date, datetime, longcharacter, etc., as are well known in the art); a display type (e.g., combobox, listbox, radiobutton, pushbutton, link, text, groupbox, image, etc., as are well known in the art); a prompt list; a related table or column in metadata 402; whether or not the field is required; the table of data for the field in application data 400; whether or not the field is for display only or can be edited; and the tab order (position) of the field on the page.

At step 804, script generator 500 analyzes application objects (i.e., metadata 402 such as a vendor information, invoice information, etc.) and application structure. Application structure refers to how each application object is related to, or interacts with, another object (e.g., in application software related to financial matters, there may be multiple vendors (objects) each having multiple invoices (objects)). Script generator 500 determines, from metadata 402, how to manage the objects during testing 330 of application software 302. Script generator 500 differentiates between various application objects such as control objects (e.g., a "Save" button) and data objects (e.g., characters entered into an application by a user). Script generator 500 ignores what data is unimportant and interprets relationships between data. For example, script generator 500 ignores duplicate field identifiers. Script generator 500 also ignores graphical only field identifiers, such as groupboxes, text and images.

Furthermore, script generator 500 establishes parent-child relationships in the form of a relationship tree. An example of a parent is an invoice header with multiple lines of an invoice as the children. Script generator 500 then ensures that the component of interest is covered in the relationship tree. Subsequently, script generator 500 enumerates nodes in the relationship tree.

Additionally, script generator 500 ignores duplicate objects. One example of duplicate objects is a vendor name occurring twice on the same page. Another example of duplicate objects is two "Save" buttons on the same page that perform the same operation. Script generator 500 thus avoids managing two different objects representing the same function or data. Script generator 500 assigns unique identifiers to properly manage the objects. For the objects that script generator 500 is going to manage, it assigns an identifier indicating that one object is different than another object (e.g., an object relating to a vendor name of "John Smith" has an identifier of "object_0007" and an object relating to a vendor company name of "Acme Corporation" has an identifier of "object_2538").

At step 806, script generator 500 generates script 502. Once script generator 500 has the information (objects and structure) to manage application software 302, it transforms this information into a set of commands in a specific programming language (e.g., Pascal, C++, Visual Basic, etc.). This set of commands, or script 502, contains the application control logic that came from metadata 402. The application control logic can be used to manage the components of application software 302 that are of interest.

In generating script 502, script generator 500 generates various commands. In one embodiment, one command is a command to open an external file (e.g., spreadsheet 504). Another command is a command to read the spreadsheet 504 file. Another command is a command to navigate to the specific component of interest that is to be tested. Another command is a command to set values for various fields related to the component of interest. Another command is a command to perform a component action, thus simulating a user's potential action. These commands are generated once for each component, in one embodiment.

Additionally, script generator 500 generates other commands for the pages within a given component. For example, one command is a command to navigate to a given page within the component. Another command is a command to set a value for fields of a page. Another command is a command to loop through the relationship tree for the page in question. For the nodes in the relationship tree, a scroll action is performed and the values are set for the fields of this node.

After script generator 500 generates the commands for one or more pages, script generator 500 generates a command to perform a component save and a command to close the file.

At step 808, script generator 500 writes script 502 (the generated commands) to an external file or elsewhere. Script 502 can then be used (repeatedly, if desired) at a subsequent time(s).

At step 810, script generator 500 reads application data 400. Application data 400 includes data that is going to be used as test data to test application software 302 using script 502. Script generator 500 queries a table in application data 400, and for at least one row, queries corresponding child tables of data. Application data 400 is optional in one embodiment, and need not comprise actual data.

At step 812, an optional step, script generator 500 writes test data to spreadsheet 504 from application data 400 and metadata 402. In one embodiment, spreadsheet 504 is a structured spreadsheet that contains the control data that was extracted from metadata 402 and is utilized in the testing of application software 302. First, a spreadsheet 504 file (or other suitable file, such as a comma delimited file) is opened. Next, for the component fields, a column is written into the spreadsheet 504 file. Each column contains, in one embodiment, a field identifier, a field identifier label, a table identifier, a data type, prompt information and test data that was queried. In one embodiment, a single script 502 is used for testing each application task. At this point, the process returns to steps 606 and 608 of FIG. 6 and script 502 is used to test application software 302, as described herein.

Thus, a system 300 has been shown and described that exhibits an efficient mechanism to automatically generate script 502 for testing application software 302. It should be noted that system 300 is not limited to automatically generating script 502 for testing application software 302, but can be used or modified to automatically generate script 502 for testing other types of software. System 300 saves a significant amount of testing time over what it would take a test user(s) many hours to accomplish otherwise.

Figure 9:
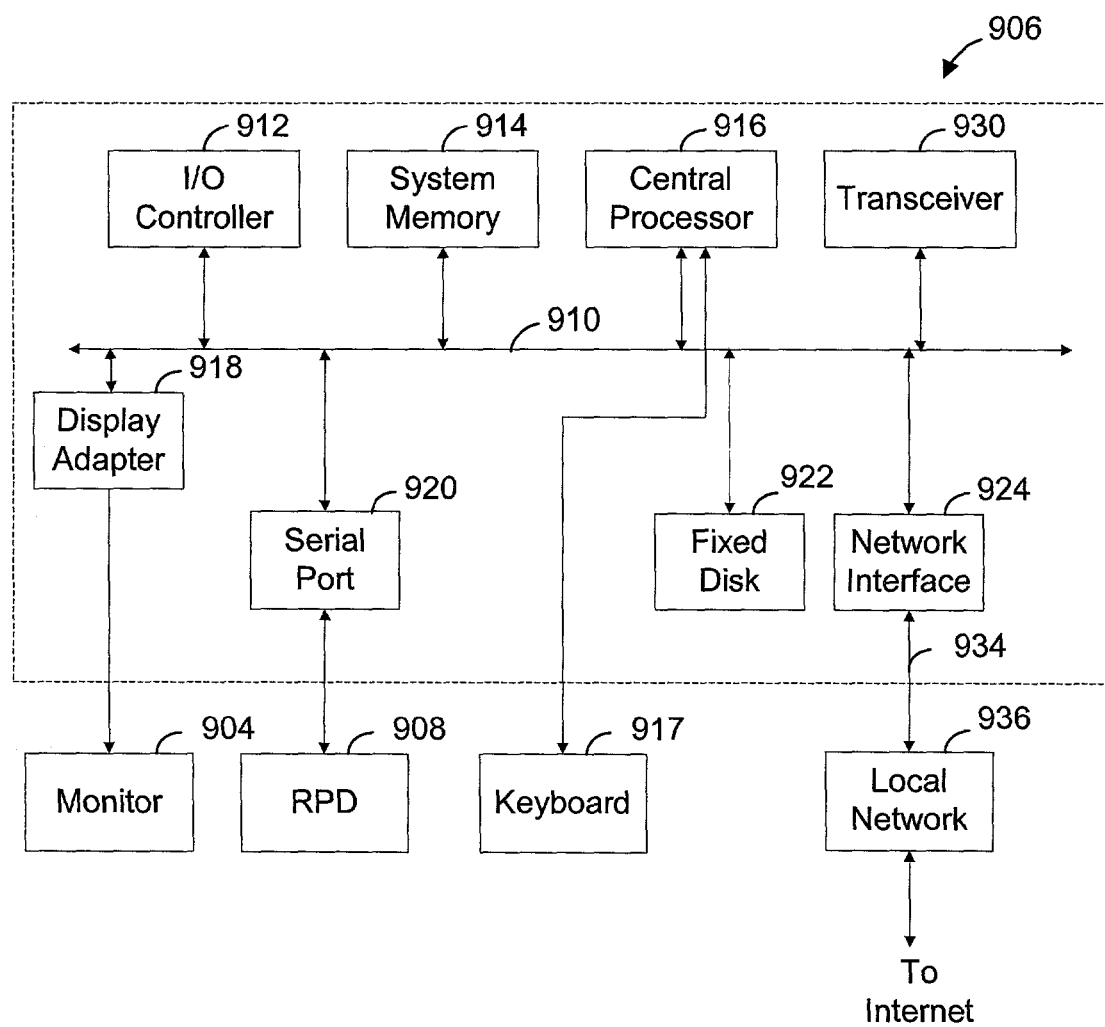
FIG. 9 illustrates subsystems of an exemplary computer system for use with the present invention.

FIG. 9 illustrates subsystems found in one exemplary computer system, such as computer system 906, that can be used in accordance with embodiments of the present invention. Computers can be configured with many different hardware components and can be made in many dimensions and styles (e.g., laptop, palmtop, server, workstation and mainframe). Thus, any hardware platform suitable for performing the processing described herein is suitable for use with the present invention.

Subsystems within computer system 906 are directly interfaced to internal bus 910. The subsystems include input/output (I/O) controller 912, system random access memory (RAM) 914, central processing unit (CPU) 916, display adapter 918, serial port 920, fixed disk 922 and network interface adapter 924. The use of bus 910 allows the subsystems to transfer data among the subsystems and, most importantly, with the CPU 916 subsystem. External devices can communicate with CPU 916 or other subsystems via bus 910 by interfacing with a subsystem on bus 910.

FIG. 9 is merely illustrative of one suitable configuration for providing a system in accordance with the present invention. Subsystems, components or devices other than those shown in FIG. 9 can be added without deviating from the scope of the invention. A suitable computer system can also be achieved without using all of the subsystems shown in FIG. 9. Other subsystems such as a CD-ROM drive, graphics accelerator, etc., can be included in the configuration without affecting the performance of computer system 906.

One embodiment according to the present invention is related to the use of an apparatus, such as computer system 906, for implementing a system according to embodiments of the present invention. CPU 916 can execute one or more sequences of one or more instructions contained in system RAM 914. Such instructions may be read into system RAM 914 from a computer-readable medium, such as fixed disk 922. Execution of the sequences of instructions contained in system RAM 914 causes the processor to perform process steps, such as the process steps described herein. One or more processors in a multi-processing arrangement may also be employed to execute the sequences of instructions contained in the memory. In some embodiments, computer system 906 further includes an RPD 908, a local network 936, and/or a connection 934 to local network 936, as illustrated in FIG. 9. In alternative embodiments, hard-wired circuitry may be used in place of or in combination with software instructions to implement the invention. Thus, embodiments according to the present invention are not limited to any specific combination of hardware circuitry and software.

The terms "computer-readable medium" and "computer-readable media" as used herein refer to any medium or media that participate in providing instructions to CPU 916 for execution. Such media can take many forms, including, but not limited to, non-volatile media, volatile media and transmission media. Non-volatile media include, for example, optical or magnetic disks, such as fixed disk 922. Volatile media include dynamic memory, such as system RAM 914. Transmission media include coaxial cables, copper wire and fiber optics, among others, including the wires that comprise one embodiment of bus 910. Transmission media can also take the form of acoustic or light waves, such as those generated during radio frequency (RF) and infrared (IR) data communications. Common forms of computer-readable media include, for example, a floppy disk, a flexible disk, a hard disk, magnetic tape, any other magnetic medium, a CD-ROM disk, digital video disk (DVD), any other optical medium, punch cards, paper tape, any other physical medium with patterns of marks or holes, a RAM, a PROM, an EPROM, a FLASHEPROM, any other memory chip or cartridge, a carrier wave, or any other medium from which a computer can read.

Various forms of computer-readable media may be involved in carrying one or more sequences of one or more instructions to CPU 916 for execution. Bus 910 carries the data to system RAM 914, from which CPU 916 retrieves and executes the instructions. The instructions received by system RAM 914 can optionally be stored on fixed disk 922 either before or after execution by CPU 916.

Many subsystem configurations are possible. FIG. 9 is illustrative of but one suitable configuration. Subsystems, components or devices other than those shown in FIG. 9 can be added. A suitable computer system can be achieved without using all of the subsystems shown in FIG. 9.

The above description is illustrative and not restrictive. Many variations of the invention will become apparent to those of skill in the art upon review of this disclosure. The scope of the invention should, therefore, be determined not with reference to the above description, but instead should be determined with reference to the appended claims along with their full scope of equivalents.

The invention claimed is:

1. A method of automatically generating a script for testing software, the method comprising:
    retrieving information from a first set of data defining the software;
    analyzing the retrieved information, the retrieved information including application objects of the software to be tested and application structure information on how the application objects are related; and
    automatically generating a script from the analyzed retrieved information for testing the software, the script including application logic generated from the first set of data defining the software, the application logic capable of performing actions with the software to test the software, the actions based on the application objects and the application structure of the software.

2. The method of claim 1, wherein the generated script is for testing a component of the software.

3. The method of claim 1, wherein the software is application software.

4. The method of claim 1, further comprising writing the script to a file.

5. The method of claim 1, further comprising extracting a second set of data from the first set of data.

6. The method of claim 1, wherein an execution engine runs the script and receives the second set of data.

7. The method of claim 6, wherein the second set of data is test data.

8. The method of claim 7, wherein the test data is extracted from application data.

9. The method of claim 1, wherein the information comprises metadata.

10. The method of claim 1, wherein retrieving information comprises reading an application front-end definition.

11. The method of claim 1, wherein retrieving information comprises retrieving information related to a component to be tested.

12. The method of claim 1, wherein retrieving information comprises retrieving a page identifier for a page within a component to be tested.

13. The method of claim 1, wherein analyzing the retrieved information comprises establishing parent-child relationships.

14. The method of claim 1, wherein generating a script from the analyzed retrieved information comprises transforming the analyzed retrieved information into a set of commands in a specific programming language.

15. A system for automatically generating a script for testing software, the system comprising:

means for defining software;

means for retrieving information from the software defining means;

means for analyzing the retrieved information including analyzing application objects and application structure for the software, the application structure including information on how the application objects are related; and means for automatically generating a script from the analyzed retrieved information for testing the software by transforming the analyzed retrieved information into a set of commands in a specific programming language, the set of commands being based on the object objects and application structure for the software.

16. The system of claim 15, further comprising means for extracting test data, the means for extracting test data configured to input the test data into a spreadsheet.

17. The system of claim 16, further comprising means for executing the script to test the software using the test data.

18. The system of claim 15, wherein the software defining means comprises metadata.

19. A method of automatically generating a script for testing software, the method comprising:

retrieving information from a first set of data defining software, the retrieved information comprising metadata related to a component to be tested;

analyzing the retrieved information including analyzing application objects and application structure for the software, the application structure including information on how the application objects are related; and automatically generating a script from the analyzed retrieved information for testing the software by transforming the analyzed retrieved information into a set of commands in a specific programming language, the set of commands being based on the object objects and application structure for the software.

20. The method of claim 19, wherein the generated script is for testing a component of the software.

21. The method of claim 19, further comprising extracting a second set of data from the first set of data.

22. The method of claim 19, wherein an execution engine runs the script and receives the second set of data.

23. The method of claim 19, wherein the second set of data is test data.

24. The method of claim 19, wherein the test data is extracted from application data.

25. The method of claim 19, wherein retrieving information comprises reading an application front-end definition.

26. The method of claim 19, wherein retrieving information comprises retrieving a page identifier for a page within the component to be tested.

27. A method of automatically generating a script for testing a software application, the method comprising:

retrieving information for the software application;

analyzing the retrieved information for the software application to determine application control logic based on code in the software application; and automatically generating a script from the analyzed retrieved information for testing the software by transforming the application control logic into a set of commands in a specific programming language, the set of commands configured to automatically test the software application.

28. The method of claim 27, wherein the retrieved information comprises metadata for the software application.

29. The method of claim 27, wherein application control logic is determined based on actions that can be performed using the software application.

30. The method of claim 27, wherein the retrieved information includes application objects for the software application, wherein the application objects are interpreted to determine the script.

31. The method of claim 30, wherein the retrieved information includes application structure including information on how the application objects are related, wherein the application structure is interpreted to determine the script.

* * * * *